US008423255B2

(12) United States Patent
Padmanabhan et al.

(10) Patent No.: US 8,423,255 B2
(45) Date of Patent: Apr. 16, 2013

(54) SYSTEM FOR SENSING ROAD AND TRAFFIC CONDITIONS

(75) Inventors: Venkata N. Padmanabhan, Bangalore, IN (US); Ramachandran Ramjee, Bangalore, IN (US); Prashanth Mohan, Bangalore, IN (US)

(73) Assignee: Microsoft Corporation, Redmond, WA (US)

(*) Notice: Subject to any disclaimer, the term of this patent is extended or adjusted under 35 U.S.C. 154(b) by 453 days.

(21) Appl. No.: 12/147,438

(22) Filed: Jun. 26, 2008

(65) Prior Publication Data

US 2009/0192688 A1 Jul. 30, 2009

Related U.S. Application Data

(60) Provisional application No. 61/024,798, filed on Jan. 30, 2008.

(51) Int. Cl.
*G06F 7/70* (2006.01)

(52) U.S. Cl.
USPC ............................................................ 701/70

(58) Field of Classification Search ................ 701/1, 29, 701/35, 45–49, 70, 117, 200, 213, 220; 340/901, 340/905, 933, 934–936
See application file for complete search history.

(56) References Cited

U.S. PATENT DOCUMENTS 6,236,933 B1 5/2001 Lang
6,466,862 B1 10/2002 DeKock et al.
6,650,948 B1 11/2003 Atkinson et al.
6,781,523 B2 8/2004 Matsui et al.
6,985,073 B1 1/2006 Doan
7,072,789 B2 * 7/2006 Vock et al. .................... 702/141
7,098,805 B2 8/2006 Meadows et al.
7,319,931 B2 1/2008 Uyeki et al.
2003/0093248 A1 * 5/2003 Vock et al. .................... 702/188
2004/0246171 A1 * 12/2004 Orr et al. ....................... 342/174
2007/0050240 A1 3/2007 Belani et al.

(Continued)

FOREIGN PATENT DOCUMENTS

KP 1020060072933 6/2006
KR 1020050089419 8/2005
WO WO-2007047600 4/2007

OTHER PUBLICATIONS

International Search Report for Application No. PCT/US09/30028; Applicant: Microsoft Corporation; Date of mailing: Jun. 29, 2009 (3 pages).

(Continued)

*Primary Examiner* — Thomas Tarcza
*Assistant Examiner* — Adam Alharbi
(74) *Attorney, Agent, or Firm* — Perkins Coie LLP

(57) ABSTRACT

A traffic sensing system for collecting information on traffic conditions is provided. A traffic sensing system includes a traffic sensing server and a mobile traffic sensing device that sends traffic reports to the traffic sensing server. An MTS device may use an accelerometer integrated into a smart phone to detect potholes, to detect when the vehicle is braking, to detect whether the MTS device is being transported via a vehicle or a pedestrian, to detect horns sounding, and so on. The MTS device reports the various conditions to the traffic sensing server for accurate assessment of traffic conditions at stretches of road through which vehicles transporting MTS devices travel.

19 Claims, 12 Drawing Sheets

U.S. PATENT DOCUMENTS

2007/0088490 A1 4/2007 Sutardja
2007/0189181 A1 8/2007 Kirk et al.
2008/0040029 A1* 2/2008 Breed ........................... 701/208

OTHER PUBLICATIONS

"BTIS: Bangalore Transport Information System—Homepage," http://www.btis.in/ [last accessed Nov. 13, 2008].
"Euler Angles—from Wolfram MathWorld," http://mathworld.wolfram.com/EulerAngles.html [last accessed Nov. 13, 2008].
"How should Spectrum be allocated?", The Economic Times-Debate-Opinion, Nov. 6, 2007, 2 pages.
"HP iPAQ hw6960 and hw6965 Mobile Messenger GSM Radio Firmware Update for ROM Version 1.21," Copyright 2008 Hewlett-Packard Development Company.
"INRIX Dynamic Predictive Traffic," Copyright 2008 INRIX, http://www.inrix.com/technology.asp [last accessed Nov. 13, 2008].
"Intelligent Transportation Systems—Its Joint Program Office Home," Research and Innovative Technology Administration (RITA) US Department of Transportation, http//www.its.dot.gov/index.htm [last accessed Nov. 13, 2008].
"Intelligent Transportation Systems—Traffic Surveillance," California Center for Innovative Transportation at the University of California at Berkley and Caltrans, Copyright 2005 UC Regents.
"Micromachined Accelerometer," MMA7260Q, Rev 1, Jun. 2005, Copyright Freescale Semiconductor 2005, 8 pages.
"OnStar by GM—Car Safety Device and Vehicle Security System," http://www.onstar.com/us_english/jsp/index.jsp [last accessed Nov. 13, 2008].
"Smart Trek: Busview," ITS Research Program, UW, http://www.its.washington.edu/projects/busview_overview.html [last accessed Nov. 13, 2008].
"SparkFun Wireless Accelerometer/Tilt Controller Version 2.5," http://www.sparkfun.com/commerce/product_info.php?products_id=254 [last accessed Nov. 13, 2008].
"Telecom Regulatory Authority of India," Information note to the Press, Oct. 22, 2007, 5 pages.
"Wireless Signal Extraction (WISE) Technology," http://www.airsage.com/wise.htm [last accessed Nov. 13, 2008].
Browne, Abigail, "3 billion Mobile Subscriptions—but only 2.3 billion subscribers," InformaTM, Jul. 2, 2007, 2 pages.
Bychkovsky, V. et al., "The CarTel Mobile Sensor Computing System," SenSys'06, Nov. 1-3, 2006, Boulder, Colorado, USA, ACM, pp. 383-384.
Chandra, Ranveer et al., "A Location-Based Management System for Enterprise Wireless LANs," In Proceedings of NSDI, 2007, pp. 1-16.
Chandra, Ranveer et al., "Beacon-Stuffing: Wi-Fi Without Associations," Mobile-Wireless Communications, Wi-Fi (802.11), 2007, 6 pages.
Chang, Remy et al., "Vision Modules for a Multi-Sensory Bridge Monitoring Approach," 7th international IEEE conference on intelligent transportation systems, ITSC 2004, Washington DC, 6 pages.
Chen, Mike et al., "Practical Metropolitan-Scale Positioning for GSM Phones," Ubicomp 2006, LNCS 4206, pp. 225-242.
Cheng, Yu-Chung et al., "Accuracy Characterization for Metropolitan-scale Wi-Fi Location," In proceedings of Mobisys 2005, Jan. 2005, 13 pages.
Cui, Y.J. et al., "Autonomous Vehicle Positioning with GPS in Urban Canyon Environments," Robotics and Automation, 2001, Proceedings 2001 ICRA. IEEE International Conference, vol. 2, 2001, 6 pages.
Dailey, Daniel, "Smart Trek: A Model Deployment Initiative," Washington State Department of Transportation, May 2001, 1 page.
Ellis, Daniel, "Detecting Alarm Sounds," Presentation at the CRAC Workshop, Aalborg, Denmark, Sep. 2001, 4 pages.
Hellinga, Bruce et al., "An Opportunity Assessment of Wireless Monitoring of Network-Wide Road Traffic Conditions," Department of Civil Engineering, University of Waterloo, Waterloo, on, Mar. 19, 2007, 88 pages, http://www.civil.uwaterloo.ca/bhellinga/Publications%20Page/Publications/MTO-2007%20Wireless%20Traffic%20Monitoring%20Final%20Report.pdf [last accessed Nov. 13, 2008].
Hoiem, Derek et al., "SOLAR: Sound Object Localization and Retrieval in Complex Audio Environments," Proceedings of the 30th IEEE International Conference on Acoustics, Speech, and Signal Processing (ICASSP), Philadelphia, 2005, 4 pages.
Jones, Willie, "Forecasting Traffic Flow," IEEE Spectrum, Jan. 2001, 2 pages.
Kim, Hyoung-Gook et al., "Audio Classification Based on MPEG-7 Spectral Basis Representations," IEEE Transactions on Circuits and Systems for Video Technology, vol. 14, No. 5, May 2004, pp. 716-725.
Krumm, John et al., "Predestination: Where Do You Want to Go Today?" IEEE Computer Society, Apr. 2007.
Lahrmann, Harry, "Floating Car Data for Traffic Monitoring," Towards Intelligent Future, Easy Way, i2TERN Conference, Jun. 20-21, 2007, Aalborg, Denmark, 4 pages.
Lu, Chang-Tien et al., "AITVS: Advanced Interactive Traffic Visualization System," Proceedings of the 22nd International Conference on Data Engineering (ICDE'06), 2006 IEEE, 2 pages.
Otsason, Veljo et al., "Accurate GSM Indoor Localization," In the proc. of UbiComp 2005, LNCS 3660,2005, pp. 141-158.
Rahmati, Ahmad et al., "Context-for-Wireless: Context-Sensitive Energy-Efficient Wireless Data Transfer," MobiSys'07, Jun. 11-14, 2007, San Juan, Puerto Rico, USA, Copyright 2007 ACM, 14 pages.
Singh, Harshimran "Mobile boom helps India reach intemet goal before time," The Economy Times, Sep. 6, 2007, http://economictimes.indiatimes.com/articleshow/2341785.cms [last accessed Nov. 13, 2008].
Varshavsky, Alex et al., "Are GSM phones the solution for localization?" In 7th IEEE Workshop on Mobile Computing Systems and Applications, 2006, 6 pages.
Wunnava, Subbarao et al., "Travel Time Estimation Using Cell Phones (TTECP) for Highways and Roadways," Final Report Prepared for the Florida Department of Transportation, 2007, 81 pages.
Yoon, Jungkeun et al, "Surface Street Traffic Estimation," MobiSys'07, Jun. 11-13, 2007, San Juan. Puerto Rico, USA, Copyright 2007 ACM, 13 pages.

* cited by examiner

SYSTEM FOR SENSING ROAD AND TRAFFIC CONDITIONS

CROSS REFERENCE TO RELATED APPLICATION

This application claims the benefit of U.S. Provisional Application No. 61/024,798, filed Jan. 30, 2008, and entitled "TRAFFICSENSE: RICH MONITORING OF ROAD AND TRAFFIC CONDITIONS USING MOBILE SMART-PHONES," which is incorporated herein in its entirety by reference.

BACKGROUND

Many traffic surveillance systems have been developed to monitor vehicle traffic in real time. The monitoring techniques used by developed nations may include global positioning system ("GPS") devices fixed to vehicles, fixed-position cameras, inductive loop vehicle detectors in the roads, Doppler radar, and so on. Based on the collected information, these systems typically estimate the speed and volume of the traffic at various locations. Because the roads are typically in good condition and traffic typically proceeds in an orderly manner in developed nations, the speed and volume information can be quite useful indications of traffic patterns. The speed and volume information can be reported to drivers (e.g., via a web site and a dedicated traffic reporting device) so that they can plan their trips accordingly. Some drivers may move up or delay their anticipated departure times or select alternative routes based on the reported information. The speed and volume information can also be reported to a department of transportation to help control the rate at which vehicles enter the flow of traffic. Because the costs of these techniques for monitoring traffic are quite high, traffic is typically monitored only at the busiest stretches of roads.

These monitoring techniques, however, may not provide predictions of traffic patterns that are as useful in developing nations for various reasons. One reason is that the road quality tends to be quite variable in developing nations. For example, bumpy roads and potholes may be common even in city centers. Another reason is that many different types of vehicles may be used in developing nations. For example, roads may be congested by two-wheeled vehicles (e.g., scooters), three-wheeled vehicles (e.g., automatic rickshaws), four-wheeled vehicles (e.g., passenger cars), and larger-number-wheeled vehicles (e.g., buses and trucks). Each type of vehicle may only be able to travel at certain speeds depending on the road conditions. For example, only two-wheeled vehicles may be able to travel on certain narrow or bumpy roads. Another reason is that traffic flows may be more chaotic because drivers in developing nations may not adhere to right-of-way protocols at intersections and may rely on sounding their horns to help establish their right-of-way. Although such sounding of horns is socially unacceptable or illegal in many developed nations, it is acceptable and quite common in many developing nations.

SUMMARY

A system for sensing road and traffic conditions ("sensing system") is provided. A sensing system includes a traffic sensing server and mobile traffic sensing ("MTS") devices that send traffic reports to the traffic sensing server. An MTS device may use an accelerometer to detect potholes, to detect when the vehicle is braking, to detect whether the MTS device is being transported via a vehicle or a pedestrian, and so on. The MTS device determines the orientation of the accelerometer relative to the vehicle based on the direction of travel as indicated by braking and the influence of gravity. The MTS device may also use a microphone of a mobile phone to collect ambient noise, which can help determine whether horns are sounding and whether the vehicle is enclosed or open. The MTS device may also communicate with neighboring MTS devices using a local area wireless network (e.g., Bluetooth) to send and receive traffic reports to one another. The MTS device may report the various conditions to the traffic sensing server for accurate assessment of traffic conditions at stretches of road through which vehicles transporting MTS devices travel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
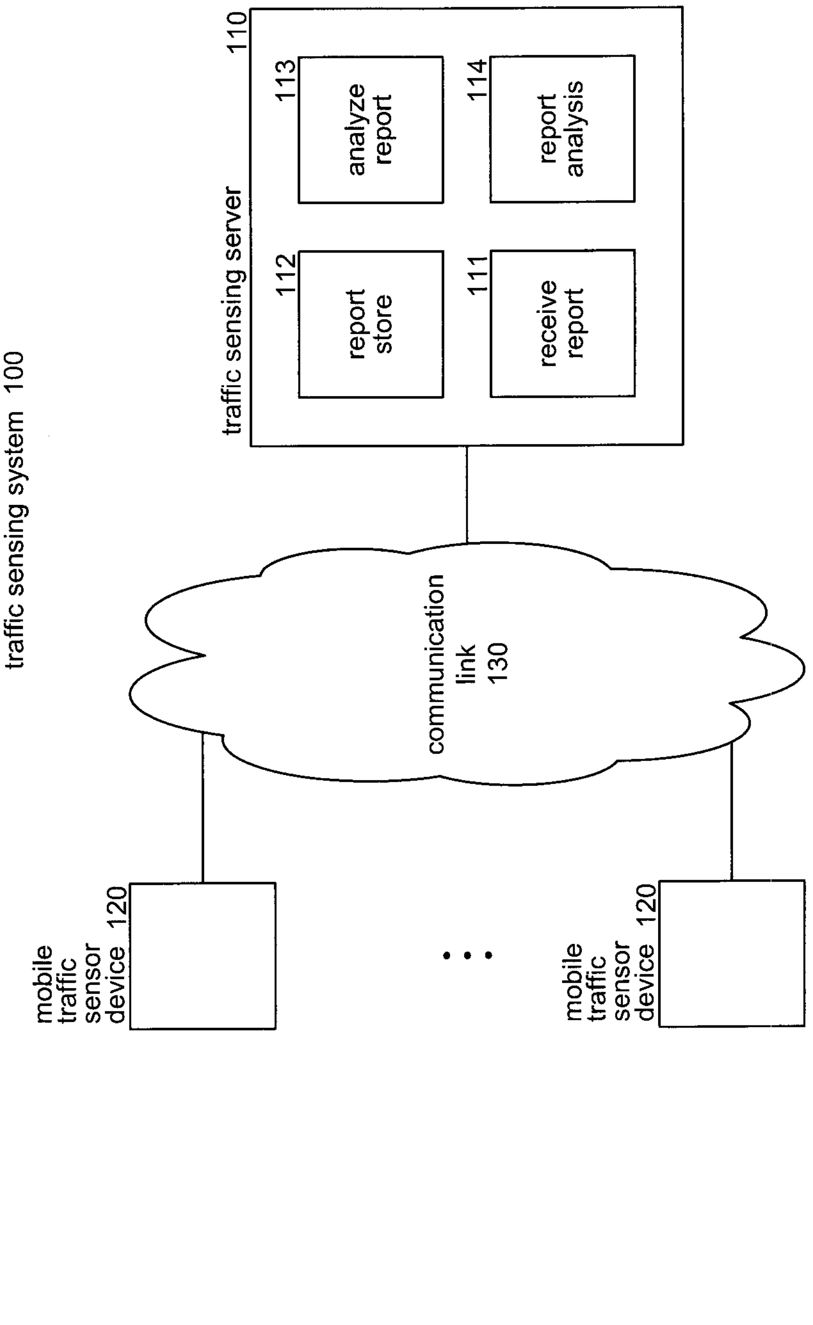
FIG. 1 is a block diagram that illustrates components of a traffic sensing system in some embodiments.

A road and traffic sensing system that collects information on traffic conditions is provided. In some embodiments, the sensing system includes a traffic sensing server and a mobile traffic sensing ("MTS") device that sends traffic reports to the traffic sensing server. An MTS device may be a smart phone that includes a 3-axis accelerometer (or a mobile phone that is augmented with an external 3-axis accelerometer) with an MTS system that includes software components to collect traffic-related information relating to a vehicle (or person) that is transporting the MTS device and to generate traffic reports based on analysis of the collected traffic-related information. Because an MTS device can be an existing smart phone with only software components added, the sensing system can be implemented using existing mobile phone infrastructure. An MTS device may use the accelerometer to detect potholes, to detect when the vehicle is braking, to detect whether the MTS device is being transported via a vehicle or a pedestrian, and so on. Because it is unlikely that the accelerometer of the MTS device would have its orientation aligned with the vehicle in which it is being transported, the MTS device determines the orientation of the accelerometer relative to the vehicle based on the direction of travel as indicated by braking and the influence of gravity. This orientation allows the MTS device to determine changes in acceleration in the direction of travel (e.g., braking) and in the vertical direction (e.g., caused by a pothole). The MTS device may also use a microphone of the mobile phone to collect ambient noise, which can help determine whether horns are sounding and whether the vehicle is closed (e.g., car) or open (e.g., scooter). The MTS device may also communicate with neighboring MTS devices using a local area wireless network (e.g., Bluetooth) to send and receive traffic reports to one another. An MTS device may use such traffic reports to determine whether the vehicle is a mass transit vehicle based on proximity to the neighboring devices. The MTS device may report the various conditions (e.g., braking, horns sounding, potholes detected, and travel speed) to the traffic sensing server for accurate assessment of traffic conditions at stretches of road through which vehicles transporting MTS devices travel.

In some embodiments, an MTS device is a smart phone, a mobile phone with an integrated accelerometer that includes various computation, communication, and sensing capabilities. The computing capabilities may include a central processing unit, memory, and an operating system. The communication capabilities may includes a radio for basic cellular voice communication (e.g., GSM) and for collecting cellular tower information and a personal-area wireless network (e.g., local area wireless network, Bluetooth, and WiFi) for communicating with neighboring MTS devices. The sensing capabilities may include a microphone, a GPS receiver, an accelerometer, and a camera. Each of these capabilities is provided by some smart phones that are currently on the market—although no smart phone necessarily has all these capabilities. The MTS devices may include various subsets of these capabilities. Certain MTS devices may be augmented with additional capabilities. For example, an accelerometer with a local area wireless network interface can be connected to certain smart phones that do not have those capabilities.

In some embodiments, an MTS device needs to virtually orient its accelerometer to the travel direction of the vehicle and the vertical direction. The MTS device performs this virtual orientation based on the influence of gravity on the accelerometer when stationary or traveling at a steady speed and based on the influence on the accelerometer during a braking event as detected using GPS locations. The MTS device uses the influence of gravity to help virtually orient the vertical axis of the accelerometer to the vertical axis of the vehicle. The MTS device uses the influence of braking to help virtually orient the forward axis of the accelerometer to the forward axis of the vehicle.

In general, the accelerometer of an MTS device is a 3-axis accelerometer that can be arbitrarily oriented relative to the travel direction and vertical direction of the vehicle. In the following, the axes of the accelerometer are represented as (x, y, z), and the axes of the vehicle are represented as (X, Y, Z). For example, if the accelerometer of a smart phone is oriented with its x axis toward the top of the phone, its y axis toward the right of the phone, and its z axis toward the back of the phone, then a phone positioned vertically in a cradle would have its z axis aligned with the direction of travel and its x axis aligned opposite the vertical axis. The x axis of the vehicle is in the direction of travel, the y axis of the vehicle is to the right of the direction of travel, and the z axis is in the down direction. The MTS system of an MTS device uses a Z-Y-Z formulation of Euler angles to determine the orientation of the accelerometer relative to the orientation of the vehicle. The orientation of the accelerometer can be represented by a pre-rotation angle of $\phi_{pre}$ about Z, followed by a tilt angle of $\theta_{tilt}$ about Y, and then a post-rotation angle of $\psi_{post}$ again about Z. When the accelerometer is stationary or in steady motion, the only acceleration it experiences is due to gravity. (Note: It is assumed that the accelerometer will report the strength of the force field so the acceleration for the z axis, $\alpha_z$, is 1 g, assuming it is correctly aligned with the z axis of the vehicles.) The tilt operation is the only operation that changes the orientation of the z axis relative to the Z axis. As a result, the following equation illustrates the transformation from z to Z:

$$\alpha_z=\alpha_z \cos(\theta_{tilt}).$$

Since $\alpha_z=1$ g, the tilt angle is represented by the following equation:

$$\theta_{tilt}=\cos^{-1}(\alpha_z).$$

The pre-rotation followed by tilt would also result in a non-zero acceleration for the x and y axes, $\alpha_x$ and $\alpha_y$, due to the effect of gravity. The values of $\alpha_x$ and $\alpha_y$ are equal to the projections of the 1 g acceleration along the Z axis onto the x and y axes. To calculate the projections, the MTS system decomposes each of $\alpha_x$ and $\alpha_y$ into their components along the X and Y axes, respectively. When the tilt (about Y) is applied, only the components of $\alpha_x$ and $\alpha_y$ along the X axis would be affected by gravity. Thus, after the pre-rotation and the tilt, the values are represented by the following equations:

$$\alpha_x=\cos(\phi_{pre})\sin(\theta_{tilt})$$

$$\alpha_y=\sin(\phi_{pre})\sin(\theta_{tilt})$$

solving for $\phi_{pre}$ results in the following equation:

$$\phi_{pre}\tan(\phi_{pre})=\alpha_y/\alpha_x$$

followed by the following equation:

$$\phi_{pre}=\tan^{-1}(\alpha_y/\alpha_x).$$

To estimate $\theta_{tilt}$ and $\phi_{pre}$ using these equations, the MTS system may identify periods when the MTS device is stationary (e.g., at a traffic light) or in steady motion (e.g., using GPS to estimate speed). Alternatively, the device may use an averaged value of $\alpha_x$, $\alpha_y$, and $\alpha_z$ collected over a certain period of time. The averaged value may be the median over a 10-second window. Thus, by computing $\alpha_x$, $\alpha_y$, and $\alpha_z$ over short time windows, the MTS system is able to estimate $\theta_{tilt}$ and $\phi_{pre}$ on an ongoing basis relatively inexpensively (i.e., by not using a high power consumption device such as a GPS device). Any significant change in $\theta_{tilt}$ and $\phi_{pre}$ would indicate a significant change in the orientation of the MTS device. In such a case, the MTS system can perform a complete virtual re-orientation of the accelerometer.

Since post-rotation (like pre-rotation) is about the Z axis, it has no impact with respect to the gravitational force field, which runs parallel to the Z axis. As a result, the MTS system uses a different force field with a known orientation that is not parallel to the Z axis to estimate the angle of post-rotation. The MTS system could use either the acceleration or braking of the vehicle, each of which produces a force field in a known direction of the X axis, which is in line with the direction of motion of the vehicle. To obtain a measurement for such a force, the MTS system monitors the location of the vehicle via the GPS device to identify periods of sharp deceleration without a significant curve in the path (i.e., the GPS track is roughly linear). Given the measured accelerations ($\alpha_x$, $\alpha_y$, $\alpha_z$), and the angles of pre-rotation $\phi_{pre}$ and tilt $\theta_{tilt}$, the MTS system estimates the angle of post-rotation $\psi_{post}$ as the one that maximizes the estimate of $\alpha'_x$ of the acceleration along the X axis, which is the direction of braking.

The MTS system computes $\alpha'_x$ by running through the steps of pre-rotation, tilt, and post-rotation in sequence. At each step, the MTS system applies the decomposition discussed above. Starting with just pre-rotation, the result is represented by the following equations:

$$\alpha'^{pre}_X=\alpha_x\cos(\phi_{pre})+\alpha_y\sin(\phi_{pre})$$

$$\alpha'^{pre}_Y=-\alpha_x\sin(\phi_{pre})+\alpha_y\cos(\phi_{pre}).$$

After the tilt is applied, the result is represented by the following equations:

$$\alpha'^{pre\text{-}tilt}_X=\alpha'^{pre}\cos(\theta_{tilt})-\alpha_z\sin(\theta_{tilt})$$

$$\alpha'^{pre\text{-}tilt}_Y=\alpha'^{pre}_Y.$$

Finally, after post-rotation is applied, the result is represented by the following equation:

$$\alpha'_X=\alpha'^{pre\text{-}tilt\text{-}post}_X=\alpha'^{pre\text{-}tilt}_X\cos(\psi_{post})+\alpha'^{pre\text{-}tilt}_Y\sin(\psi_{post}).$$

Expanding these equations, results in the following equation:

$$a_x=[(a_x\cos(\phi_{pre})+a_y\sin(\phi_{pre}))\cos(\theta_{tilt})-a_z\sin(\theta_{tilt})]\cos(\psi_{post})+[-a_x\sin(\phi_{pre})+a_y\cos(\phi_{pre})]\sin(\psi_{post}).$$

To maximize $\alpha'_x$ consistent with the period of sharp deceleration, the MTS system sets its derivative with respect to $$\psi_{post}\left(\frac{d\,a'_x}{d\,\psi_{post}}\right)$$

to zero, as represented by the following equation:

$$-[(\alpha_x\cos(\phi_{pre})+\alpha_y\sin(\phi_{pre}))\cos(\theta_{tilt})-\alpha_z\sin(\theta_{tilt})]\sin(\psi_{post})+[-\alpha_x\sin(\phi_{pre})+\alpha_y\cos(\phi_{pre})]\cos(\psi_{post})=0,$$

which yields an estimate of $\psi_{post}$ represented by the following equation:

$$\psi_{post}=\tan^{-1}\left(\frac{-a_x\sin(\phi_{pre})+a_y\cos(\phi_{pre})}{(a_x\cos(\phi_{pre})+a_y\sin(\phi_{pre}))\cos(\theta_{tilt})-a_z\sin(\theta_{tilt})}\right).$$

Thus, to estimate the post-rotation angle, the MTS system first estimates the pre-rotation and tilt angles. The MTS system then identifies an instance of sharp deceleration using GPS data and records the mean $\alpha_x$, $\alpha_y$, and $\alpha_z$ during this period (e.g., 2 seconds). Compared to estimating the pre-rotation and tilt angles, estimating the post-rotation angle is more elaborate and expensive, requiring the GPS device to be turned on. Thus, the MTS system monitors the pre-rotation and tilt angles on an ongoing basis, and only if there is a significant change in these or there is other evidence that the MTS device's orientation may have changed (e.g., a call being made or other user interaction with the phone) does the MTS system perform a complete virtual re-orientation of the accelerometer.

In some embodiments, the MTS system detects braking events, which may indicate poor driving conditions (e.g., fog) or heavy traffic. Although the GPS data could be used to detect a braking event, it would incur high energy costs. To avoid this cost, the MTS system monitors the acceleration in the forward direction as indicated by the accelerometer. If the mean acceleration over a sliding window of a certain number of seconds exceeds a threshold acceleration, then the MTS system signals a braking event. For example, if the deceleration is at least 1 m/s$^2$ sustained over four seconds (i.e., a decrease in speed of at least 14.4 kmph over 4 seconds), then the MTS system signals a braking event.

In some embodiments, the MTS system uses different algorithms to detect a pothole based on whether the vehicle is traveling at a slow speed or not. A slow speed may be defined as below a slow speed threshold (e.g., 25 kmph). If the vehicle is not traveling at a slow speed, then the MTS system checks for a spike in the acceleration in the vertical direction. If a spike in the acceleration is greater than a threshold acceleration, then the MTS system signals that a pothole has been detected. If the vehicle is traveling at a slow speed, then the MTS system looks for a sustained dip in the acceleration in the vertical direction, for example, if the object is below a threshold acceleration for at least 20 milliseconds (e.g., seven samples at a sampling rate of 310 Hz). Since only an approximate vehicle speed is needed, the MTS system may use a convex hull location algorithm (described below) to estimate the location of the MTS device at different points in time and derive the speed from the changes in location.

In some embodiments, the MTS system may determine whether the MTS device is being transported by a pedestrian or by a vehicle or is stationary. Since a vehicle traveling in stop-and-go traffic will brake often, the MTS system relies on the characteristics of vehicle braking events to distinguish the vehicle in stop-and-go traffic traveling at a pedestrian speed from a pedestrian transporting the MTS device. So, when braking events are detected while the speed of the MTS device is below a pedestrian speed threshold, the MTS system signals that a vehicle, rather than a pedestrian, is transporting the MTS device.

In some embodiments, the MTS system samples a microphone to determine whether horns are being sounded. The MTS system collects sound samples over a time period and performs a discrete Fourier transform to convert the samples to the frequency domain. The MTS system then detects frequency spikes, which may be defined to be a certain number (e.g., 5 to 10) of times greater than the mean amplitude of the frequencies. The sounding of a horn may be defined as having at least two frequency spikes with one being within the 2.5 kHz to 4 kHz range, which is a characteristic frequency that corresponds to the range of highest human ear sensitivity. One skilled in the art will appreciate, however, that different criteria can be used to detect different sounds by different types of horn. The criteria can be determined based on experimental sampling of horn sounds.

In some embodiments, the MTS system samples a microphone to determine the enclosure type of a vehicle. The MTS system may sample the microphone over a certain period (e.g., 10 seconds) and calculate the mean sound level. If the sound level is nearer a minimum sound level than to a maximum sound level, then the MTS system designates the enclosure type as closed (e.g., a car). If, however the sound level is nearer the maximum sound level, then the MTS system designates the enclosure type as open (e.g., a scooter). The MTS system may establish the minimum and maximum sound levels by sampling sound levels of vehicles known to be open and vehicles known to be closed. The ambient noise of an open vehicle that is very high may be an indication of chaotic traffic.

In some embodiments, the MTS system compares the location of the MTS device to the location of neighboring MTS devices to determine whether the vehicle type is mass transit or not. If the MTS system determines that several neighboring MTS devices are in close proximity and have similar traffic characteristics (e.g., braking patterns and vehicle speed), then the MTS system assumes that all the devices are on a mass transit vehicle such as a bus or train. The presence of many neighboring MTS devices in close proximity, but not on the same mass transit vehicle, may be an indication of congested traffic.

In some embodiments, the MTS system uses algorithms performed based on data collected by lower energy consumption devices to determine when to enable algorithms based on data collected by higher energy consumption devices. For example, a cellular localization algorithm based on cellular tower (or cellular transmitter) information requires data from the cellular radio, which is a lower energy consumption device, while a GPS localization algorithm based on GPS data requires data from the GPS device, which is a higher energy consumption device. The MTS system uses the cellular localization algorithm to identify the approximate location of a pothole. When an MTS device (that MTS device or another) later approaches the approximate location of that pothole, the MTS system may enable the GPS localization algorithm to determine a more precise location of the pothole when it is encountered again. As described above, the MTS system also uses the braking activity and the corresponding change in acceleration as measured by the accelerometer to determine whether a reorientation of the accelerometer should be performed, which uses GPS data.

FIG. 1 is a block diagram that illustrates components of a traffic sensing system in some embodiments. A traffic sensing system 100 includes a traffic sensing server 110 connected to various mobile traffic sensing devices 120 via a communication link 130. The traffic sensing server may include a receive report component 111, a report store 112, an analyze report component 113, and a report analysis component 114. The receive report component receives traffic reports from the MTS devices and stores them in the report store. The analyze report component analyzes the traffic reports to identify traffic conditions at various locations. For example, the analyze report component may determine that, based on braking patterns, horn sounding patterns, and speed patterns, chaotic traffic conditions are occurring at an intersection. The report analysis component may report the various traffic conditions to drivers and others. For example, the traffic sensing server may provide web pages through which drivers can view maps illustrating traffic conditions, may send text messages to drivers, may transmit conditions via a radio, may provide traffic conditions to a navigation system for suggesting routes based on the traffic conditions, may provide the traffic conditions to a department of transportation for regulating traffic flow, and so on. A navigation system may use the reported road and traffic conditions to identify routes that a driver might find more desirable than routes identified based solely on driving time and distance. For example, the navigation system may seek to avoid roads with potholes, noisy roads, congested roads (even though driving time may be less on the congested road), and so on. The navigation system can provide a map that illustrates the suggested route, alternative suggested routes, and/or a route identified based solely on driving time or distance. The traffic sensing server may be connected to the MTS devices via a communication link such as a cellular network.

Figure 2:
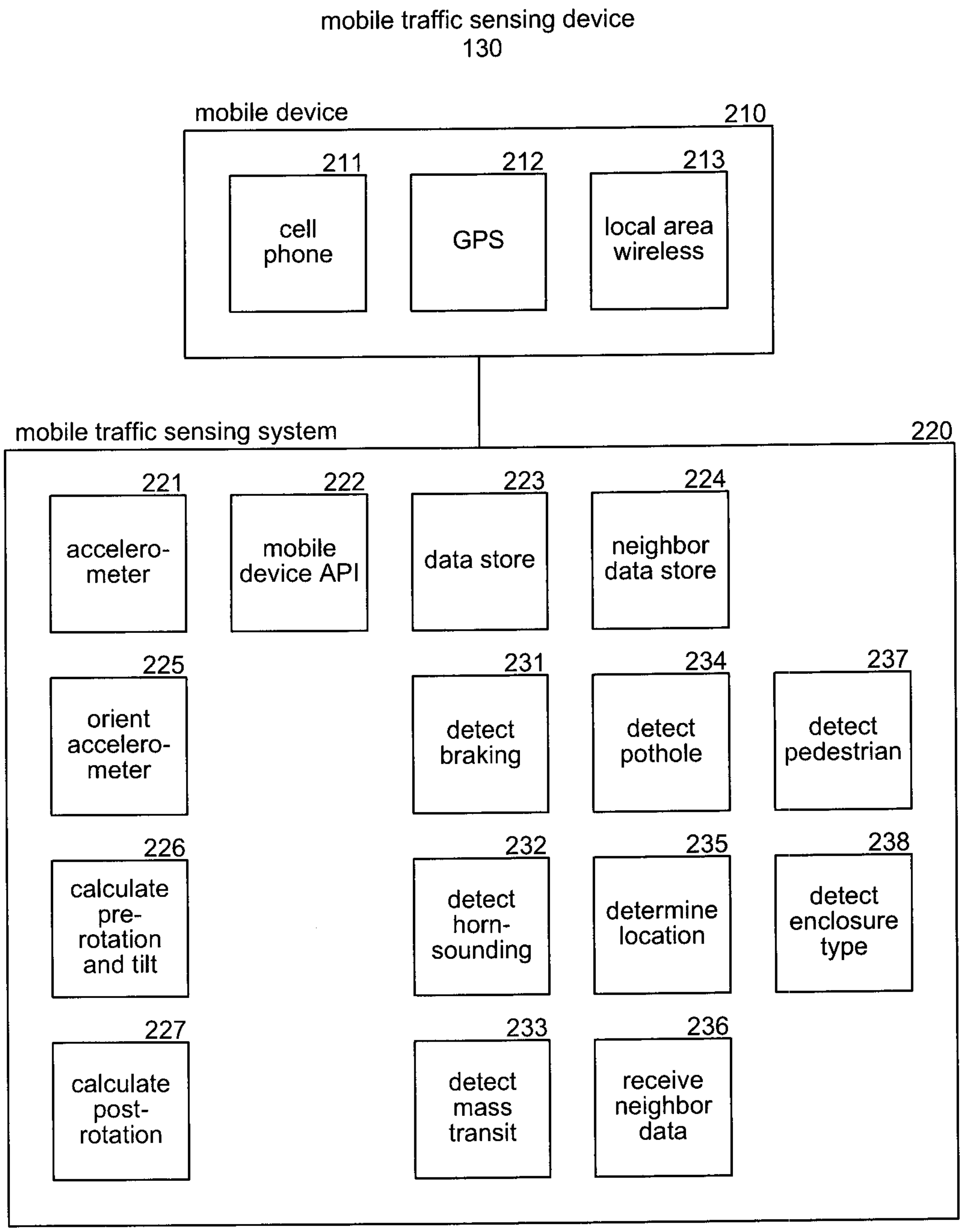
FIG. 2 is a block diagram that illustrates components of a mobile traffic sensing device in some embodiments.

FIG. 2 is a block diagram that illustrates components of a mobile traffic sensing device in some embodiments. An MTS device 130 includes mobile device components 210 and an MTS system 220. The mobile device components include a cell phone 211, a GPS device 212, and a local area wireless network interface 213. The MTS system includes an accelerometer 221, a mobile device API 222, a data store 223, and a neighbor data store 224. The accelerometer provides acceleration data for the x, y, and z axes, which is converted to acceleration data for the X, Y, and Z axes using the orientation angles. The mobile device API provides access to data collected by a mobile device. The data store is used to store data collected by and results of analysis of the MTS system. The neighbor data store contains traffic reports received from neighboring MTS devices. The MTS system also includes an orient accelerometer component 225, a calculate pre-rotation and tilt component 226, and a calculate post-rotation component 227. The orient accelerometer component is invoked to determine the orientation of the accelerometer relative to the transporting vehicle. The orient accelerometer component invokes the calculate pre-rotation and tilt component and the calculate post-rotation component to determine the orientation. The MTS system also includes a detect braking component 231, a detect horn sounding component 232, a detect mass transit component 233, a detect pothole component 234, a determine location component 235, a receive neighbor data component 236, a detect pedestrian component 237, and a detect enclosure type component 238. Each of these components is described below in detail.

The components of the traffic sensing system may include a central processing unit, memory, input devices, output devices, and storage devices, and communication ports. The memory and storage devices are computer-readable storage media that may be encoded with computer-executable instructions that implement the components of the traffic sensing system, which means a computer-readable storage medium that contains the instructions. In addition, the instructions, data structures, and message structures may be stored or transmitted via a data transmission medium, such as a signal on a communication link.

The components of the traffic sensing system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, depending on the bandwidth of the communication link between the MTS devices and the traffic sensing server, some of the functionality described as being performed at an MTS device may be performed at the traffic sensing server.

Figure 3:
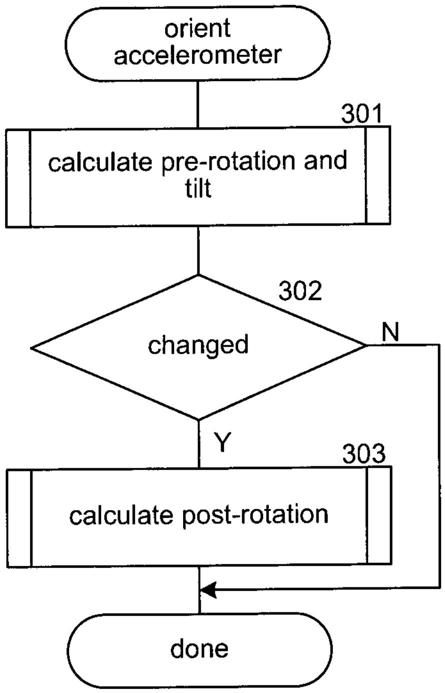
FIG. 3 is a flow diagram that illustrates the processing of an orient accelerometer component in some embodiments.

FIG. 3 is a flow diagram that illustrates the processing of an orient accelerometer component in some embodiments. The component is invoked to determine the orientation of the accelerometer relative to the transporting vehicle. In block 301, the component invokes the calculate pre-rotation and tilt component. In decision block 302, if the pre-rotation angle and the tilt angle indicate that the orientation of the accelerometer relative to the transporting vehicle has changed, then the component continues at block 303, else the component completes. In block 303, the component invokes the calculate post-rotation component to calculate the post-rotation angle using GPS data and then completes.

Figure 4:
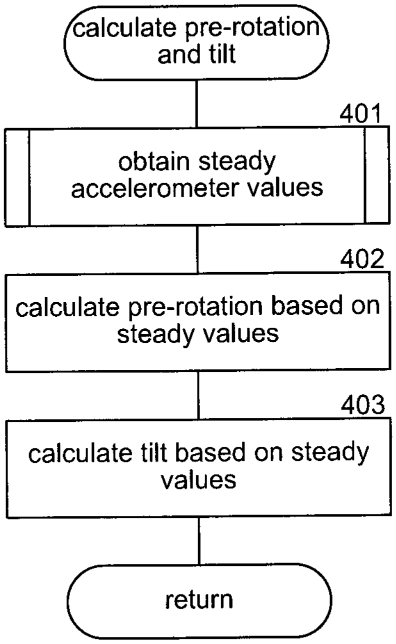
FIG. 4 is a flow diagram that illustrates the processing of a calculate pre-rotation and tilt component in some embodiments.

FIG. 4 is a flow diagram that illustrates the processing of a calculate pre-rotation and tilt component in some embodiments. The component calculates the pre-rotation angle and the tilt angle based on the influence of gravity on the accelerometer. In block 401, the component invokes an obtain steady accelerometer values component to retrieve acceleration values of the x, y, and z axes when the vehicle is stopped or moving at a relatively constant speed. In block 402, the component calculates the pre-rotation angle based on the steady accelerometer values. In block 403, the component calculates the tilt angle based on the steady accelerometer values and then returns.

Figure 5:
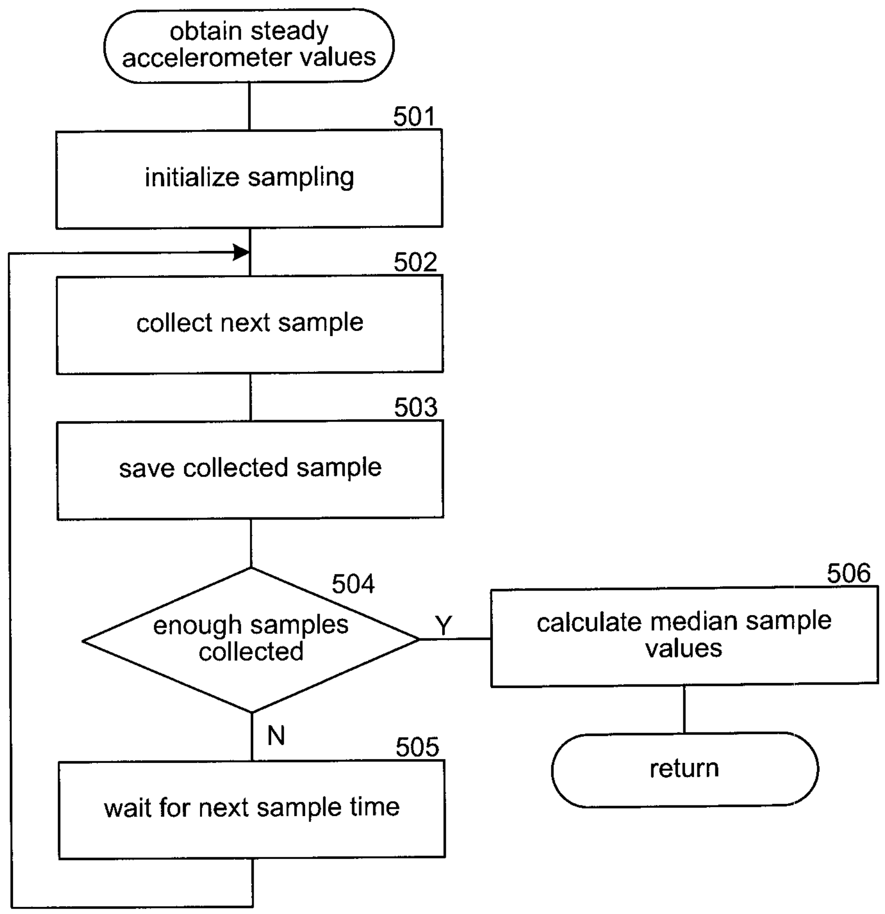
FIG. 5 is a flow diagram that illustrates the processing of an obtain steady accelerometer values component in some embodiments.

FIG. 5 is a flow diagram that illustrates the processing of an obtain steady accelerometer values component in some embodiments. The component samples the accelerometer values over a period of time and then uses the median value as the steady accelerometer values. In block 501, the component initializes the sampling of the accelerometer. In blocks 502-505, the component loops, collecting samples over the period of time. In block 502, the component collects the next sample. In block 503, the component saves the collected sample. In decision block 504, if enough samples have been collected (e.g., the time period has expired), then the component continues at block 506, else the component continues at block 505. In block 505, the component waits for the next sample time and then loops to block 502 to collect the next sample. In block 506, the component calculates the median sample values and then returns.

Figure 6:
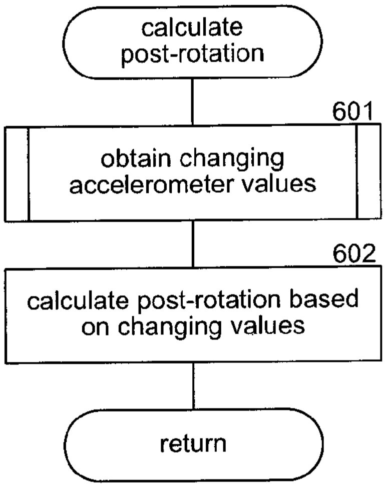
FIG. 6 is a flow diagram that illustrates the processing of a calculate post-rotation component in some embodiments.

FIG. 6 is a flow diagram that illustrates the processing of a calculate post-rotation component in some embodiments. The component obtains changing accelerometer values and then calculates the post-rotation angle. In block 601, the component invokes an obtain changing accelerometer values component to obtain changing accelerometer values. In block 602, the component calculates the post-rotation angle based on the changing accelerometer values and then returns.

Figure 7:
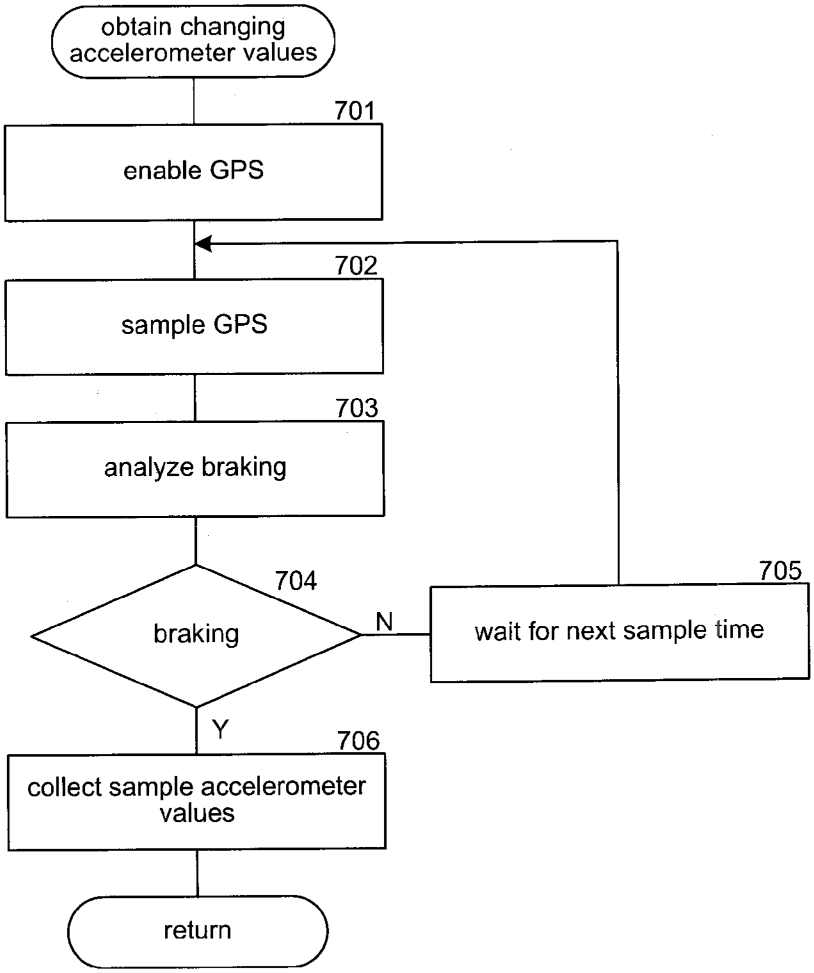
FIG. 7 is a flow diagram that illustrates the processing of an obtain changing accelerometer values component in some embodiments.

FIG. 7 is a flow diagram that illustrates the processing of an obtain changing accelerometer values component in some embodiments. The component samples GPS data until it determines that the vehicle is braking (e.g., indicating changing accelerometer values), and then it collects sample accelerometer values. In block 701, the component enables a GPS device, which may be a high energy consumption device. In blocks 702-705, the component loops, collecting GPS samples until a braking event is identified. In block 702, the component collects a GPS sample. In block 703, the component analyzes the samples that have been collected to determine whether a braking event has occurred. In decision block 704, if a braking event has occurred, then the component continues at block 706, else the component continues at block 705. In block 705, the component waits for the next sample time and then loops to block 702 to collect the next GPS sample. In block 706, the component collects sample accelerometer values as the changing accelerometer values and then returns.

Figure 8:
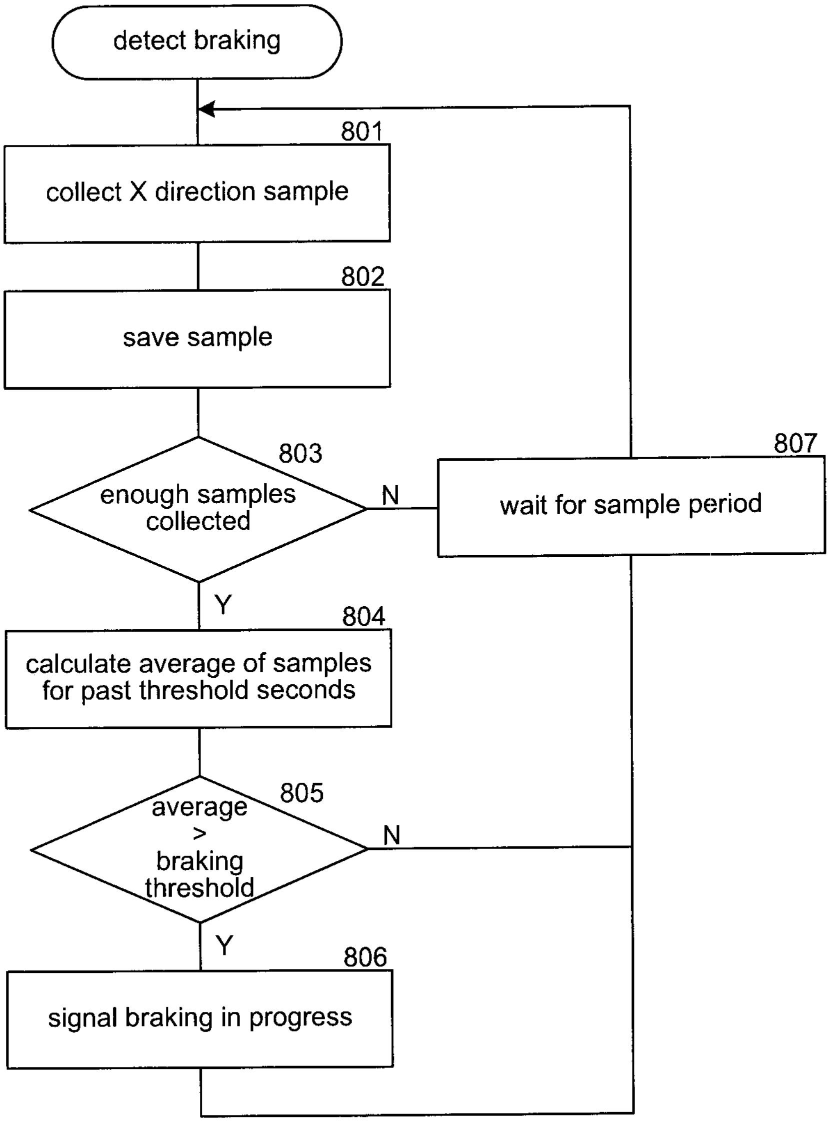
FIG. 8 is a flow diagram that illustrates the processing of a detect braking component in some embodiments.

FIG. 8 is a flow diagram that illustrates the processing of a detect braking component in some embodiments. The component detects a braking event based on changes in the acceleration of the vehicle as indicated by the accelerometer. In blocks 801-807, the component loops, collecting accelerometer samples and determining whether a braking event is in progress. In block 801, the component collects the next accelerometer sample of the X axis. The component collects the accelerometer values for the x, y, and z axes and then uses the orientation angles to calculate the combined contribution to the X axis of the vehicle. In block 802, the component saves the sample acceleration. In decision block 803, if enough samples have been collected to perform a braking analysis, then the component continues at block 804, else the component continues at block 807. In block 804, the component calculates the average of the samples within a threshold time period. In decision block 805, if the average acceleration is greater than a braking threshold acceleration, then the component continues at block 806, else the component continues at block 807. In block 806, the component signals that braking is in progress and continues at block 807. In block 807, the component waits for the next sample and then loops to block 801 to collect the next accelerometer sample.

Figure 9:
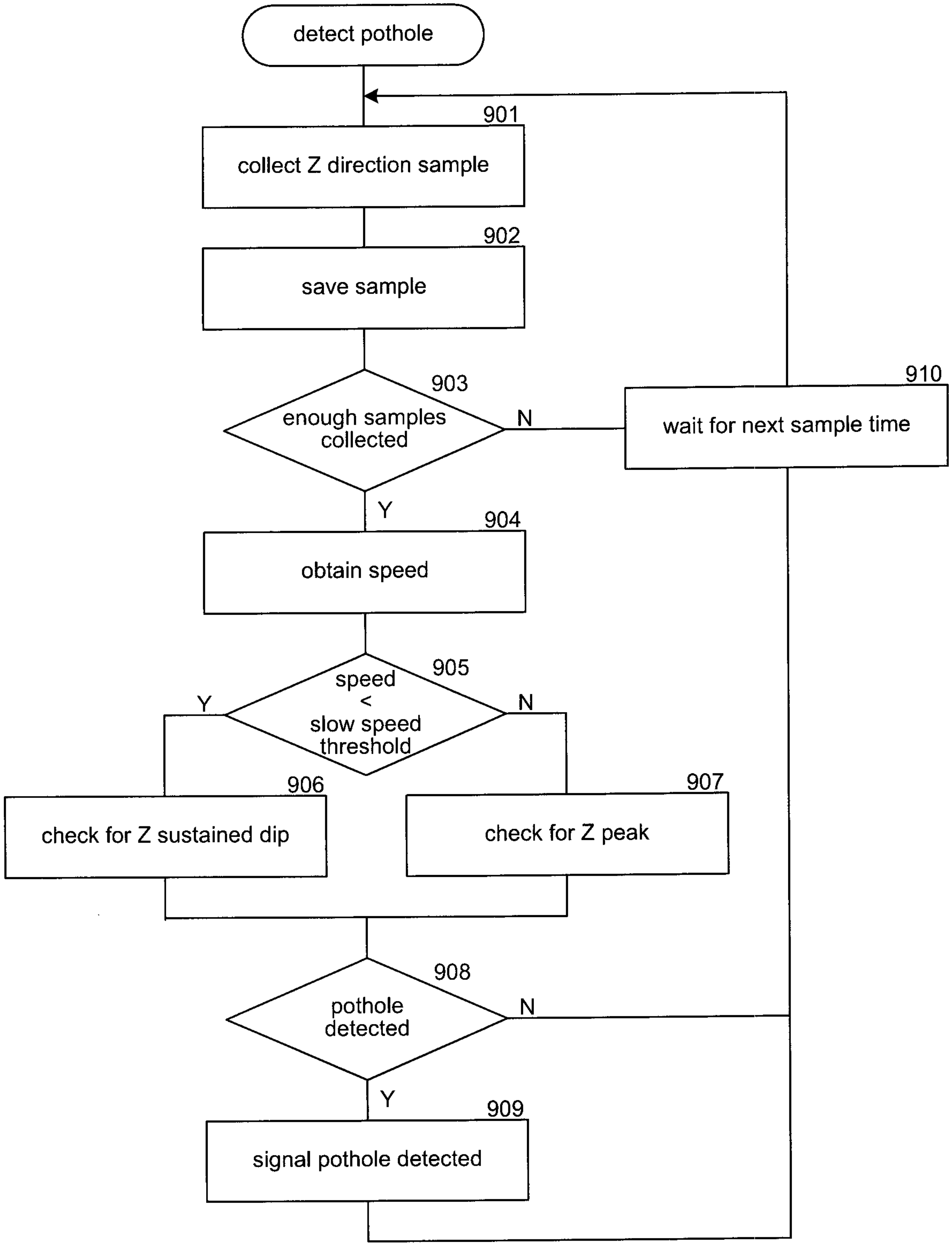
FIG. 9 is a flow diagram that illustrates the processing of a detect pothole component in some embodiments.

FIG. 9 is a flow diagram that illustrates the processing of a detect pothole component in some embodiments. The component samples acceleration data for the Z axis and applies a speed-based algorithm to determine whether a pothole has been encountered. In block 901, the component collects the acceleration for the Z axis. The component collects acceleration for the x, y, and z axes of the accelerometer and uses the orientation data to calculate the contribution to the acceleration for the Z axis. In block 902, the component saves the sample. In decision block 903, if enough samples have been collected to perform the pothole analysis, then the component continues at block 904, else the component continues at block 910. In block 904, the component obtains the speed of the vehicle. In decision block 905, if the speed is less than a slow speed threshold, then the component continues at block 906, else the component continues at block 907. In block 906, the component checks for a sustained dip in the acceleration of the Z axis. In block 907, the component checks for a peak acceleration in the Z axis. In decision block 908, if a pothole is detected, then the component continues at block 909, else the component continues at block 910. In block 909, the component signals that a pothole has been detected and continues at block 910. In block 910, the component waits for the next sample time and then loops to block 901 to collect the next accelerometer sample.

Figure 10:
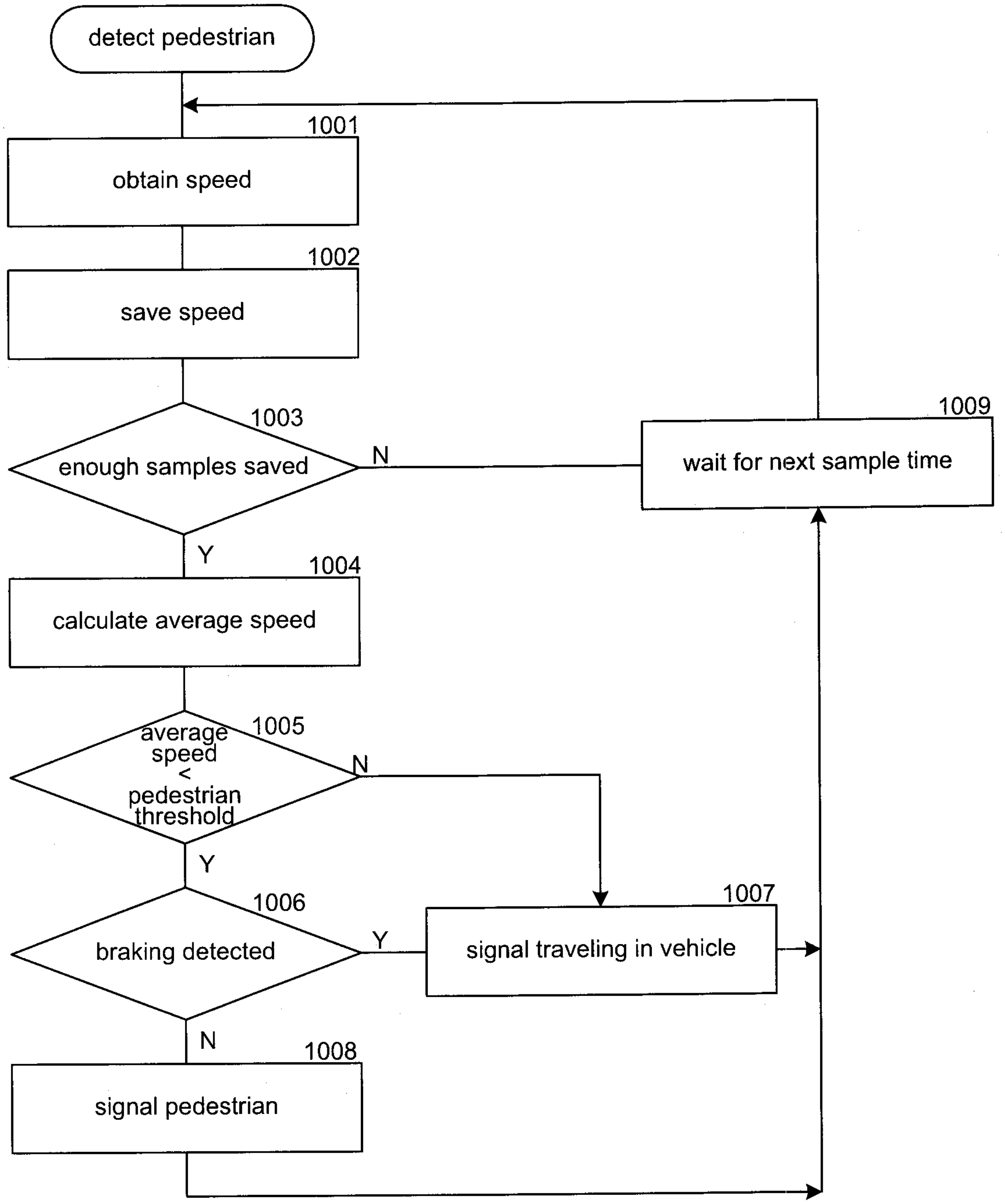
FIG. 10 is a flow diagram that illustrates the processing of a detect pedestrian component in some embodiments.

FIG. 10 is a flow diagram that illustrates the processing of a detect pedestrian component in some embodiments. The detect pedestrian component detects whether the MTS device is being transported by a vehicle or a pedestrian. In block 1001, the component obtains the speed of the MTS device. In block 1002, the component saves the speed. In decision block 1003, if enough speed samples have been saved to perform the pedestrian detection analysis, then the component continues at block 1004, else the component continues at block 1009. In block 1004, the component calculates the average speed over a certain time period. In decision block 1005, if the average speed is less than a pedestrian threshold speed, then the component continues at block 1006, else the component continues at block 1007. In decision block 1006, if a braking event is detected, then the component continues at block 1007, else the component continues at block 1008. In block 1007, the component signals that the MTS device is being transported by a vehicle and then continues at block 1009. In block 1008, the component signals that the MTS device is being transported by a pedestrian and continues at block 1009. In block 1009, the component waits for the next sample time and then loops to block 1001 to obtain the next sample.

Figure 11:
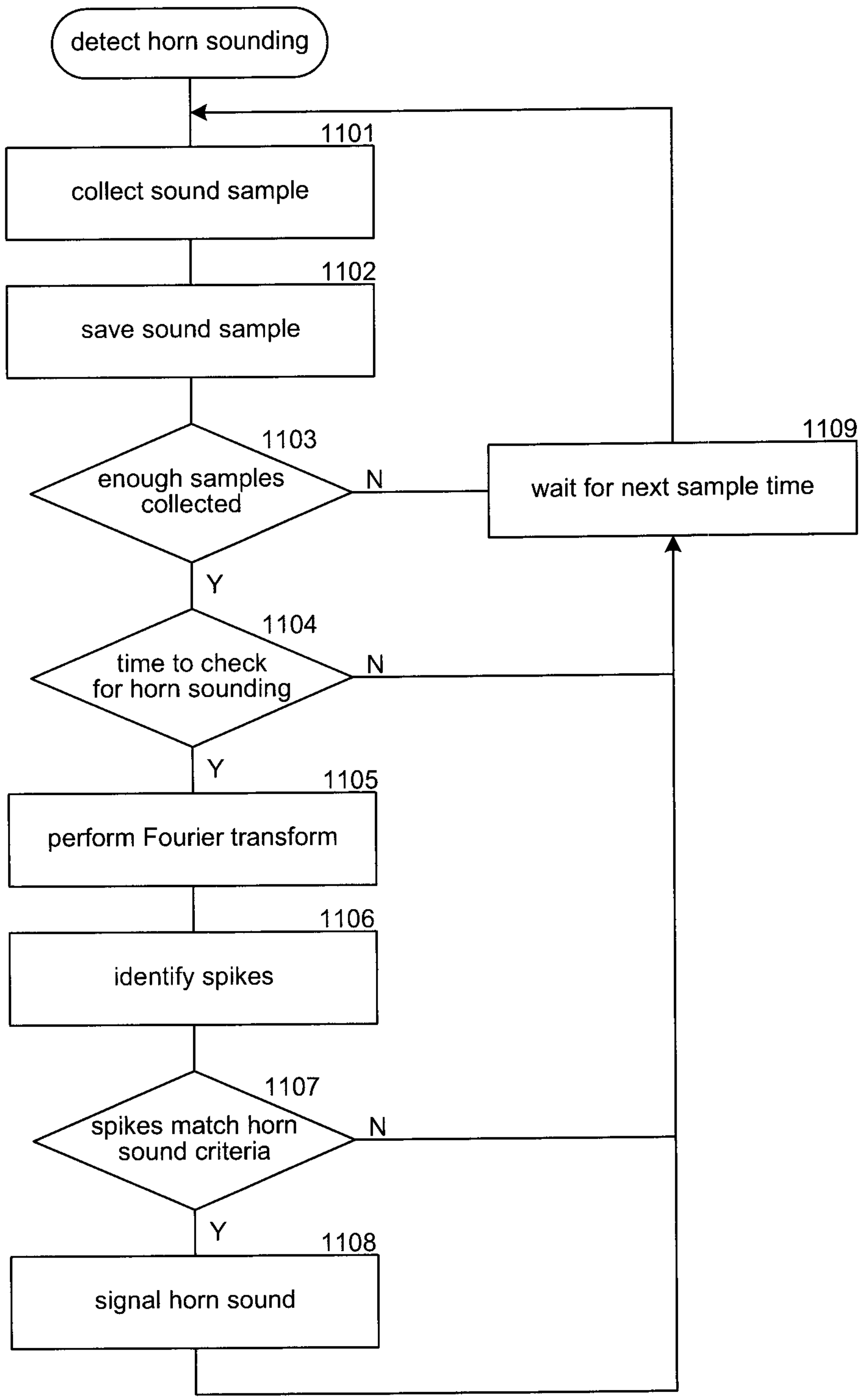
FIG. 11 is a flow diagram that illustrates the processing of a detect horn sounding component in some embodiments.

FIG. 11 is a flow diagram that illustrates the processing of a detect horn sounding component in some embodiments. The component collects sound samples from the microphone of the cell phone and detects whether a horn is sounding. In block 1101, the component collects a sound sample. In block 1102, the component saves the collected sound sample. In decision block 1103, if enough sound samples have been collected to perform the analysis, then the component continues at block 1104, else the component continues at block 1109. In decision block 1104, if it is time again to check for a horn sounding, then the component continues at block 1105, else the component continues at block 1109. In block 1105, the component performs a discrete Fourier transform on the collected samples to determine the frequency range of the samples. In block 1106, the component identifies any spikes within the amplitudes of the frequencies. In decision block 1107, if the identified spikes match a horn sound criteria, then the component continues at block 1108, else the component continues at block 1109. In block 1108, the component signals that a horn sound has been detected and then continues at block 1109. In block 1109, the component waits for the next sample time and then loops to block 1101 to collect the next sound sample.

Figure 12:
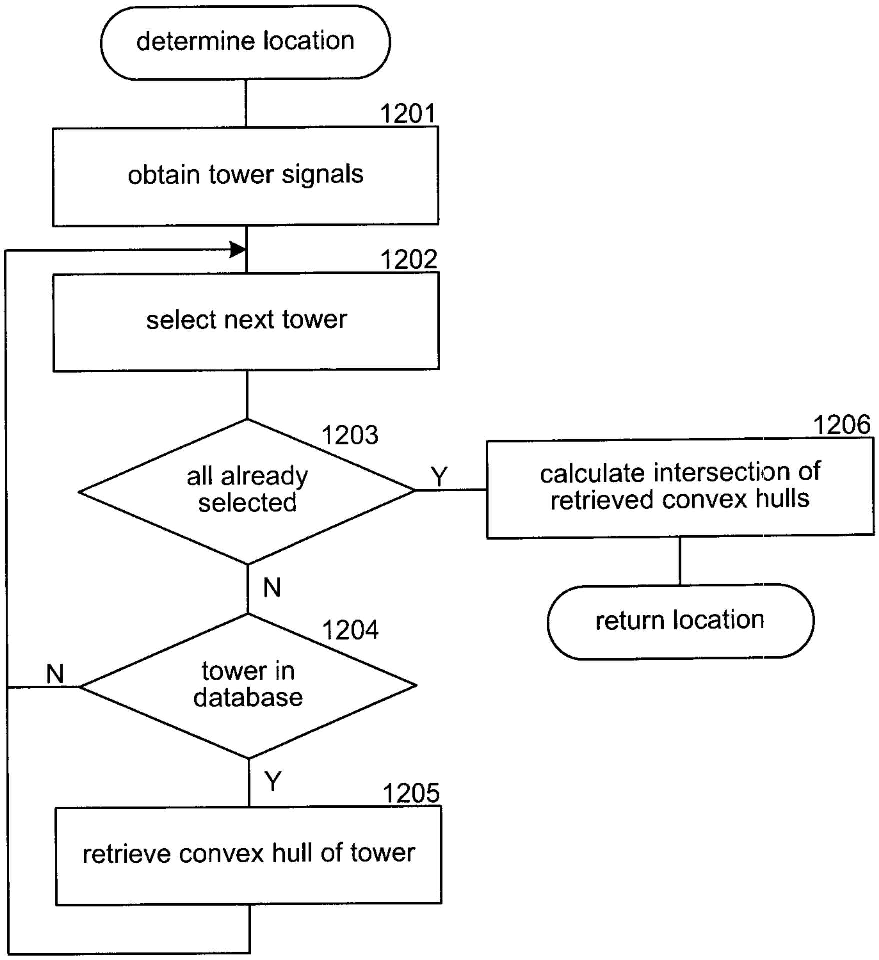
FIG. 12 is a flow diagram that illustrates the processing of a determine location component in some embodiments.

FIG. 12 is a flow diagram that illustrates the processing of a determine location component in some embodiments. The component determines the location of the MTS device based on a convex hull associated with each tower with which the MTS device is in contact. In block 1201, the component obtains the tower signals. In blocks 1202-1205, the component loops retrieving the convex hull for each tower. In block 1202, the component selects the next tower. In decision block 1203, if all the towers have been selected, then the component continues at block 1206, else the component continues at block 1204. In decision block 1204, if the tower is in a database of tower information, then the component continues at block 1205, else the component loops to block 1202 to select the next tower. In block 1205, the component retrieves from the database the convex hull of the tower and then loops to block 1202 to select the next tower. In block 1206, the component calculates the intersection of the retrieved convex hulls as the location of the MTS device and then returns. The traffic sensing system may determine the convex hulls of the tower by collecting GPS location information and nearby tower information over a period of time. From this information, the traffic sensing system can identify the convex hull for the various towers. Because such convex hulls may not all actually overlap the vehicle location (e.g., because of sparse data collection), there may not be an area of intersection of all the convex hulls. Thus, the component may find the intersection of various combinations of the convex hulls and select the area of smallest intersection as the location of the vehicle.

Figure 13:
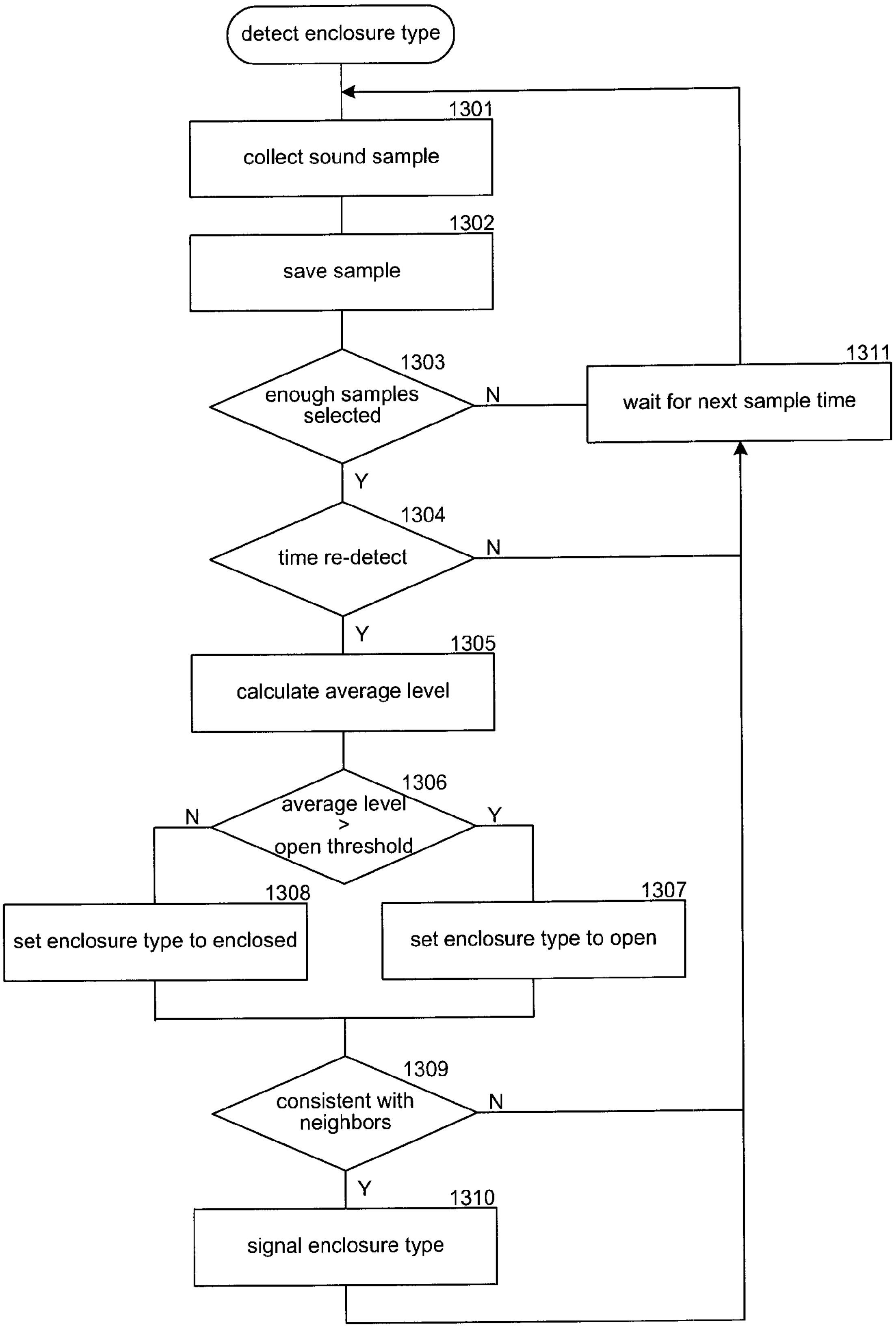
FIG. 13 is a flow diagram that illustrates the processing of a detect enclosure type component in some embodiments.

FIG. 13 is a flow diagram that illustrates the processing of a detect enclosure type component in some embodiments. The component detects whether the vehicle enclosure type is open or closed. In block 1301, the component collects a sound sample from the microphone. In block 1302, the component saves the collected sound sample. In decision block 1303, if enough sound samples have been collected to perform the analysis, then the component continues at block 1304, else the component continues at block 1311. In decision block 1304, if it is time to re-detect enclosure type, then the component continues at block 1305, else the component continues at block 1311. In block 1305, the component calculates the average sound level over a time period. In decision block 1306, if the average sound level is greater than an open threshold sound level, then the component continues at block 1307, else the component continues at block 1308. In block 1307, the component sets the enclosure type to open and continues at block 1309. In block 1308, the component sets the enclosure type to closed and continues at block 1309. In decision block 1309, if the sound levels are consistent with sound levels detected by neighboring MTS devices, then the component continues at block 1310, else the component continues at block 1311. In block 1310, the component signals the appropriate enclosure type and then continues at block 1311. In block 1311, the component waits for the next sample time and then loops to block 1301 to collect the next sound sample.

Figure 14:
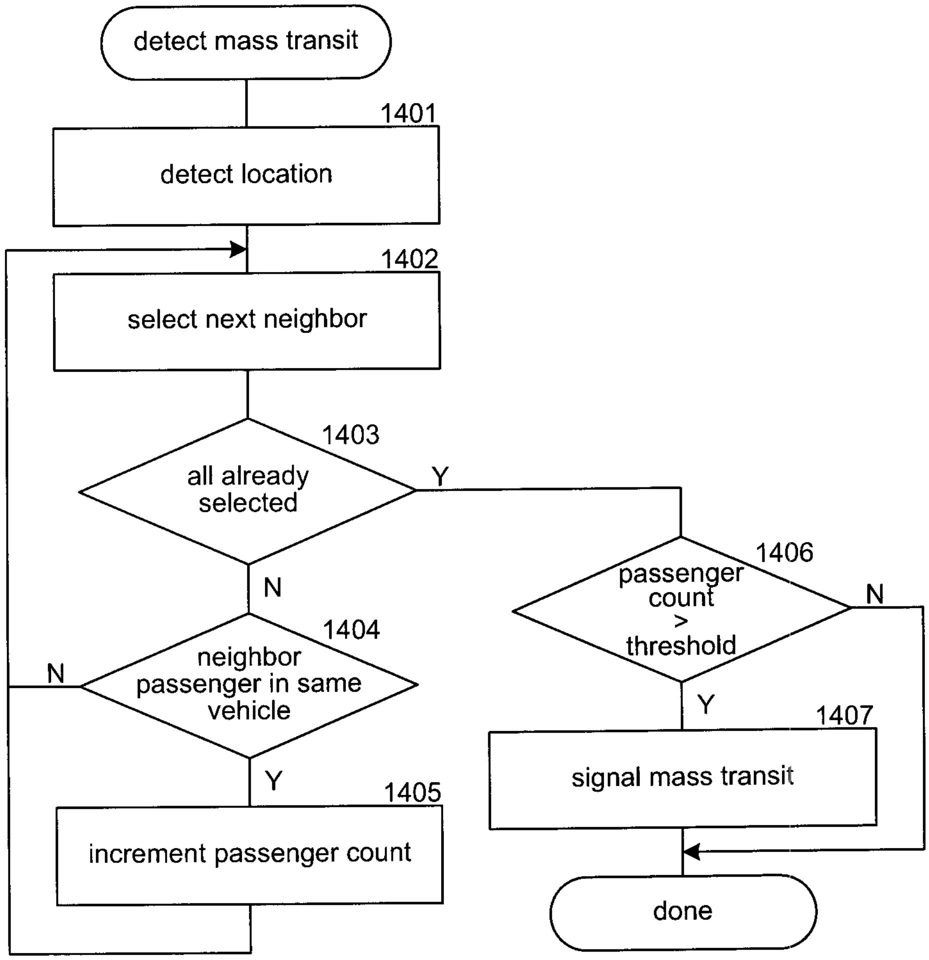
FIG. 14 is a flow diagram that illustrates the processing of a detect mass transit component in some embodiments.

FIG. 14 is a flow diagram that illustrates the processing of a detect mass transit component in some embodiments. The component determines whether the vehicle type is a mass transit vehicle or a passenger vehicle. In block 1401, the component determines the location of the MTS device. In blocks 1402-1405, the component loops determining whether nearby MTS devices are likely in the same vehicle. In block 1402, the component selects the next neighboring MTS device. In decision block 1403, if all the neighbor MTS devices have already been selected, then the component continues at block 1406, else the component continues at block 1404. In decision block 1404, if the traffic reports of the selected neighboring MTS device indicate that it is being transported by a passenger within the same vehicle, then the component continues at block 1405, else the component loops to block 1402 to select the next neighboring MTS device. In block 1405, the component increments a passenger count and then loops to block 1402 to select the next neighboring MTS device. In decision block 1406, if the passenger count is greater than a threshold passenger count, then the component continues at block 1407, else the component completes. In block 1407, the component signals that the MTS device is in a mass transit vehicle and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A traffic sensing system for collecting information on traffic conditions, the system comprising:

a traffic sensing server for receiving traffic reports from mobile traffic sensing devices and providing aggregate traffic reports from the received traffic reports; and a plurality of mobile traffic sensing devices for sensing traffic-related information near the devices and sending traffic reports to the traffic sensing server, the mobile traffic sensing devices being smart phones being transported by vehicles, each smart phone being arbitrarily oriented in a vehicle, each smart phone including an accelerometer and a cellular communication device, a component that determines the orientation of the accelerometer based on a direction of travel of the vehicle transporting the smart phone as indicated by a braking force of the vehicle and based on a direction of gravity as indicated by a gravitational force, the orientation being determined even though the accelerometer is included in a smart phone that is arbitrarily oriented in the vehicle, a component that samples the accelerometer, and a component that derives traffic-related information from the accelerometer samples.

2. The traffic sensing system of claim 1 wherein the component that determines the orientation computes a pre-rotation angle, a tilt angle, and a post-rotation angle based on the gravitational and braking forces.

3. The traffic sensing system of claim 2 wherein the accelerometer is virtually re-oriented so that to a canonical direction of X is along the forward direction of a vehicle transporting a mobile traffic sensing device, Y is along the direction to the side of the vehicle, and Z is vertically down.

4. The traffic sensing system of claim 1 wherein the braking forces are generated as a result of movement of a vehicle transporting a mobile traffic sensing device.

5. The traffic sensing system of claim 1 wherein a mobile traffic sensing device includes a component that detects whether a vehicle that is transporting the device is currently braking.

6. The traffic sensing system of claim 5 wherein a mobile traffic sensing device detects whether the vehicle that is transporting the mobile traffic sensing device is braking based on changes in accelerometer reading.

7. The traffic sensing system of claim 1 wherein a mobile traffic sensing device includes a microphone for sampling ambient sound near the device and a component that detects whether a horn is sounding based on the sampling of the ambient sound.

8. The traffic sensing system of claim 7 wherein the component that detects whether a horn is sounding does so based on generating a frequency spectrum of the samples of ambient sound and detecting multiple peaks with one peak being within a characteristic frequency associated with a sounding horn.

9. The traffic sensing system of claim 1 wherein a mobile traffic sensing device includes a component that detects whether a vehicle transporting the device has encountered a pothole.

10. The traffic sensing system of claim 9 wherein the component that detects whether a vehicle has encountered a pothole does so by checking for a spike in accelerometer samples in a vertical direction when the vehicle is traveling faster than a slow speed threshold and by checking for a sustained dip in the accelerometer samples when the vehicle is traveling slower than the slow speed threshold.

11. The traffic sensing system of claim 1 wherein a mobile traffic sensing device includes a component that detects whether the device is being transported by a vehicle or a pedestrian.

12. The traffic sensing system of claim 11 wherein the component that detects whether the device is being transported by a vehicle or a pedestrian does so by determining whether braking is detected based on changes in accelerometer samples.

13. The traffic sensing system of claim 1 wherein a mobile traffic sensing device includes a component that determines location of the device based on signals received by the device from cellular transmitters and an intersection of convex hulls that represent transmission range of those cellular transmitters.

14. The traffic sensing system of claim 1 wherein a mobile traffic sensing device includes a microphone for sampling ambient sound near the device and a component that detects enclosure type of a vehicle transporting the device based on a level of the ambient sound.

15. The traffic sensing system of claim 14 wherein some mobile traffic sensing devices send traffic reports to other mobile traffic sensing devices via a local area wireless network and wherein the enclosure type is based in part on traffic reports received from other mobile traffic sensing devices.

16. The traffic sensing system of claim 1 wherein some mobile traffic sensing devices send traffic reports to other mobile traffic sensing devices via a personal-area wireless network and include a component that detects whether a device is currently being transported by a mass transit vehicle based on proximity to the other devices as indicated by the traffic reports.

17. The traffic sensing system of claim 1 wherein a mobile traffic sensing device includes a higher energy consumption device that is enabled only when an algorithm that uses data of a lower energy consumption device determines that data from the higher energy consumption device is needed.

18. A traffic sensing system for collecting information on traffic conditions, the system comprising:

a traffic sensing server that receives traffic reports from mobile traffic sensing devices and provides aggregate traffic reports generated from the received traffic reports; and a plurality of mobile traffic sensing devices that each includes:

a cellular phone with a microphone;

a global positioning system device;

an accelerometer; and a component that generates and sends traffic reports while the mobile traffic sensing device is being transported via a vehicle, the mobile traffic sensing device having an arbitrary orientation within the vehicle, the component including:

a component that determines a current orientation of the accelerometer of the mobile traffic sensing device that has an arbitrary orientation in the vehicle, a component that samples the accelerometer and the global positioning system device, a component that derives traffic-related information from the accelerometer based on the current orientation and the global positioning device samples, and a component that samples the microphone as an indicator of ambient noise around the vehicle.

19. A cellular phone for collecting information on traffic conditions, the cellular phone comprising:

a microphone;

a global positioning system device;

an accelerometer;

a personal-area wireless network interface;

a memory storing computer-executable instructions of a component that generates and sends traffic reports while the cellular phone is being transported in a vehicle by determining orientation the accelerometer, sampling the accelerometer, the global positioning system device, and the microphone, inputting traffic reports via the personal-area wireless network interface from neighboring cellular phones that collect information about traffic conditions, and deriving traffic-related information from the accelerometer, the global positioning system device, and the microphone samples and the traffic reports input from neighboring cellular phones; and a processor executing the instructions stored in the memory.

* * * * *